UNITED STATES PATENT OFFICE.

FREDERICK C. ATKINSON, OF INDIANAPOLIS, INDIANA.

BAKING-POWDER AND PROCESS OF MAKING SAME.

1,286,904.     Specification of Letters Patent.     Patented Dec. 10, 1918.

No Drawing. Original application filed May 21, 1917, Serial No. 169,922. Divided and this application filed August 20, 1917. Serial No. 187,123.

*To all whom it may concern:*

Be it known that I, FREDERICK C. ATKINSON, a citizen of the United States, residing at Indianapolis, Marion county, and State of Indiana, have invented and discovered certain new and useful Improvements in Baking-Powders and Processes of Making Same, of which the following is a specification.

This application is a division of my application Serial Number 169,922, filed May 21st 1917, for baking powders and processes of making same.

The object of the invention is to produce a baking powder which is non-effervescing under the action of moisture and which is adapted to inhibit the release of the raising gases thereof until the application of the heat used in the baking stuff.

In producing the product, either one or both of the active constituents of the baking powder are coated with a fatty material which is insoluble in water, and which provides a protective medium separating the active constituents and preventing their chemical combination, but which medium is adapted to melt at elevated temperatures such as used in cooking and which therefore serves to release the constitutents at the time of baking, and to permit of their combination. The fats or fatty oils which are used are those which are insoluble in water and may be called wax-like fats, and preferably a melted, hardened fat is employed. The preferred example of such fats is melted, hydrogenated corn oil.

The product may be prepared by several methods. The preferred method is to mix either the sodium bicarbonates or other suitable active alkaline carbonate constituents with tartaric acid (cream of tartar) or other acids which may be used, with the hard fat in a molten condition and then spraying the mixture whereupon the same will be thrown down into the form of a fine, dry powder with the particles of the active constituents coated with the fat. Either one or both of the active constitutents may be thus coated. In thus treating the powder constituents it is not necessary that all the particles of the powder be coated, merely the major part of the mass, and in fact it may be desirable to leave some part of the body uncoated.

The coating may also be effected by spraying the liquid fat alone directly into the active powder constituent.

It may also be formed by mixing either one or both of the powder constituents with the fat while the latter is in a molten condition and then grinding the mixture or mixtures.

With a baking powder thus formed the same, or that portion of the mass which is coated, will be insoluble in water, and hence will not effervesce when it is mixed with flour and water preliminarily to baking, and the chemical combination between the acid and the base constituents and consequent release of the raising gases take place only when such temperature as that which is used in cooking is applied thereto, so that gases are released only at the time of cooking. The advantage of this function is that the effect of the gases is not dissipated and wasted during the step of mixing the flour and powder with the water. This advantage is of particular value in the preparation and cooking of such articles as griddle cakes and waffles.

Having thus described my invention, what I claim is:—

1. A baking powder having the particles of an active element thereof coated with melted hydrogenated corn oil.

2. The process of forming a baking powder which consists in coating an active constituent of baking powders with a melted, insoluble fat and reducing the completed product to a dry powder and mixing the constituents.

3. The process of forming a baking powder which consists in mixing an active baking powder constituent with a fat in molten state and then spraying the mixture and cooling the spray as it falls to form the powder.

In witness whereof, I have hereunto set my hand and seal at Indianapolis this 10th day of August, A. D. nineteen hundred and seventeen.

FREDERICK C. ATKINSON. [L. S.]

Witnesses:
H. P. DOOLITTLE,
M. L. SHULER.